(12) United States Patent
Johnson

(10) Patent No.: US 9,927,174 B2
(45) Date of Patent: Mar. 27, 2018

(54) SELF TORREFIED PELLET STOVE

(71) Applicant: Geoffrey W. A. Johnson, Redmond, WA (US)

(72) Inventor: Geoffrey W. A. Johnson, Redmond, WA (US)

( * ) Notice: Subject to any disclaimer, the term of this patent is extended or adjusted under 35 U.S.C. 154(b) by 278 days.

(21) Appl. No.: 15/041,898

(22) Filed: Feb. 11, 2016

(65) Prior Publication Data

US 2016/0341423 A1 Nov. 24, 2016

Related U.S. Application Data

(60) Provisional application No. 62/164,115, filed on May 20, 2015.

(51) Int. Cl.
| | |
|---|---|
| *F26B 23/02* | (2006.01) |
| *C10J 3/00* | (2006.01) |
| *C10B 47/44* | (2006.01) |
| *C10L 9/08* | (2006.01) |
| *F23K 1/04* | (2006.01) |
| *F23G 5/027* | (2006.01) |
| *F24B 1/02* | (2006.01) |
| *F23K 3/16* | (2006.01) |
| *F24B 1/08* | (2006.01) |

(52) U.S. Cl.
CPC .......... *F26B 23/022* (2013.01); *C10B 47/44* (2013.01); *C10J 3/007* (2013.01); *C10L 9/083* (2013.01); *F23G 5/027* (2013.01); *F23K 1/04* (2013.01); *F24B 1/024* (2013.01); *F23K 3/16* (2013.01); *F23K 2203/202* (2013.01); *F23K 2900/01041* (2013.01); *F24B 1/08* (2013.01); *Y02E 50/15* (2013.01)

(58) Field of Classification Search
CPC .......... C10L 9/083; Y02E 50/15; F23G 5/027; C10B 47/44; C10J 3/007; F26B 23/022
See application file for complete search history.

(56) References Cited

U.S. PATENT DOCUMENTS

| | | | | |
|---|---|---|---|---|
| 5,296,004 | A * | 3/1994 | Johnson | C10L 11/04 44/502 |
| 6,398,921 | B1 * | 6/2002 | Moraski | C02F 1/302 110/346 |
| 6,619,214 | B2 * | 9/2003 | Walker | F23G 5/027 110/101 R |
| 6,758,150 | B2 * | 7/2004 | Ballantine | C10B 47/44 110/110 |
| D601,684 | S * | 10/2009 | Johnson | D23/332 |
| 7,611,576 | B2 * | 11/2009 | Rabiner | B09B 3/00 106/745 |
| 7,832,343 | B2 * | 11/2010 | Walker | F23G 5/0276 110/110 |
| 7,878,131 | B2 * | 2/2011 | Becchetti | C10J 3/66 110/220 |

(Continued)

*Primary Examiner* — David J Laux

(57) ABSTRACT

A pellet stove, having a pellet hopper, a combustion chamber, a heat exchanger and a pellet movement assembly, adapted to move the pellets from the hopper into the combustion chamber. The pellet movement assembly is located and configured so as to be heated by exhaust gases from the combustion chamber and the pellets spend a sufficient amount of time in the pellet movement assembly, where oxygen is prevented from freely flowing in, so that the pellets are torrefied during transit to the combustion chamber.

16 Claims, 3 Drawing Sheets

(56) References Cited

U.S. PATENT DOCUMENTS

| | | | | |
|---|---|---|---|---|
| 8,377,155 | B2* | 2/2013 | Tyer | C10J 3/30 |
| | | | | 201/31 |
| 8,444,828 | B2* | 5/2013 | Wolfe | C10B 47/44 |
| | | | | 201/15 |
| 8,459,192 | B2* | 6/2013 | Ahola | C10J 3/40 |
| | | | | 110/229 |
| 9,045,693 | B2* | 6/2015 | Wolfe | C10J 3/007 |
| 9,127,227 | B2* | 9/2015 | Brock | C10L 5/44 |
| 2005/0039651 | A1* | 2/2005 | Cole | C10B 47/28 |
| | | | | 110/341 |
| 2008/0072807 | A1* | 3/2008 | Brookes | F23G 5/0273 |
| | | | | 110/346 |
| 2015/0107499 | A1* | 4/2015 | Olofsson | C10B 7/10 |
| | | | | 110/346 |
| 2015/0143742 | A1* | 5/2015 | Prud'Homme | C10L 9/083 |
| | | | | 44/606 |
| 2016/0024389 | A1* | 1/2016 | Endou | F01K 13/00 |
| | | | | 60/670 |

\* cited by examiner

SELF TORREFIED PELLET STOVE

BACKGROUND

In a pellet stove, fuel pellets are stored in a pellet hopper, sometimes found at the rear and or side of the stove. Most stoves use screw augers, located so as not to be heated by the heat exchanger, to move pellets smoothly and efficiently from the pellet hopper to the combustion chamber.

Unfortunately, the burning of pellets by this type of stove is not as efficient as would be ultimately desirable. Moisture in the pellets prevents the heat in the combustion chamber from that required to achieve the highest burn efficiency. This relatively low burn efficiency also causes unburned combustible compounds to escape from the stove into the atmosphere. With increasing societal awareness of air pollution, governmental bodies are increasingly originating and enforcing standards against pellet stoves. Accordingly, it is desirable to have a pellet stove that would achieve more complete fuel consumption, both for the greater economy achieved and for the lower emissions.

SUMMARY

In a first separate aspect, the present invention may take the form of a pellet stove, having a pellet hopper, a combustion chamber and a pellet movement assembly, adapted to move the pellets from the hopper into the combustion chamber. The pellet movement assembly is located and configured so as to be heated by exhaust gases from the combustion chamber and the pellets spend a sufficient amount of time in the pellet movement assembly, where oxygen is prevented from freely flowing in, so that the pellets are torrefied during transit to the combustion chamber.

In a separate aspect, the present invention may take the form of a method of burning pellets in a pellet stove, wherein the pellet stove has a pellet hopper, a combustion chamber in which pellets are being burned, and a pellet movement assembly adapted to move the pellets from the hopper into the combustion chamber. Further, the pellet movement assembly is located and configured so as to be heated by exhaust gases from the combustion chamber. In the method, the pellets are moved to the combustion chamber while maintaining a low oxygen environment in the movement assembly, so that the pellets are torrefied as they move to the combustion chamber. The torrefied pellets are delivered to the combustion chamber, where heat and oxygen within the combustion chamber ignite them.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1:
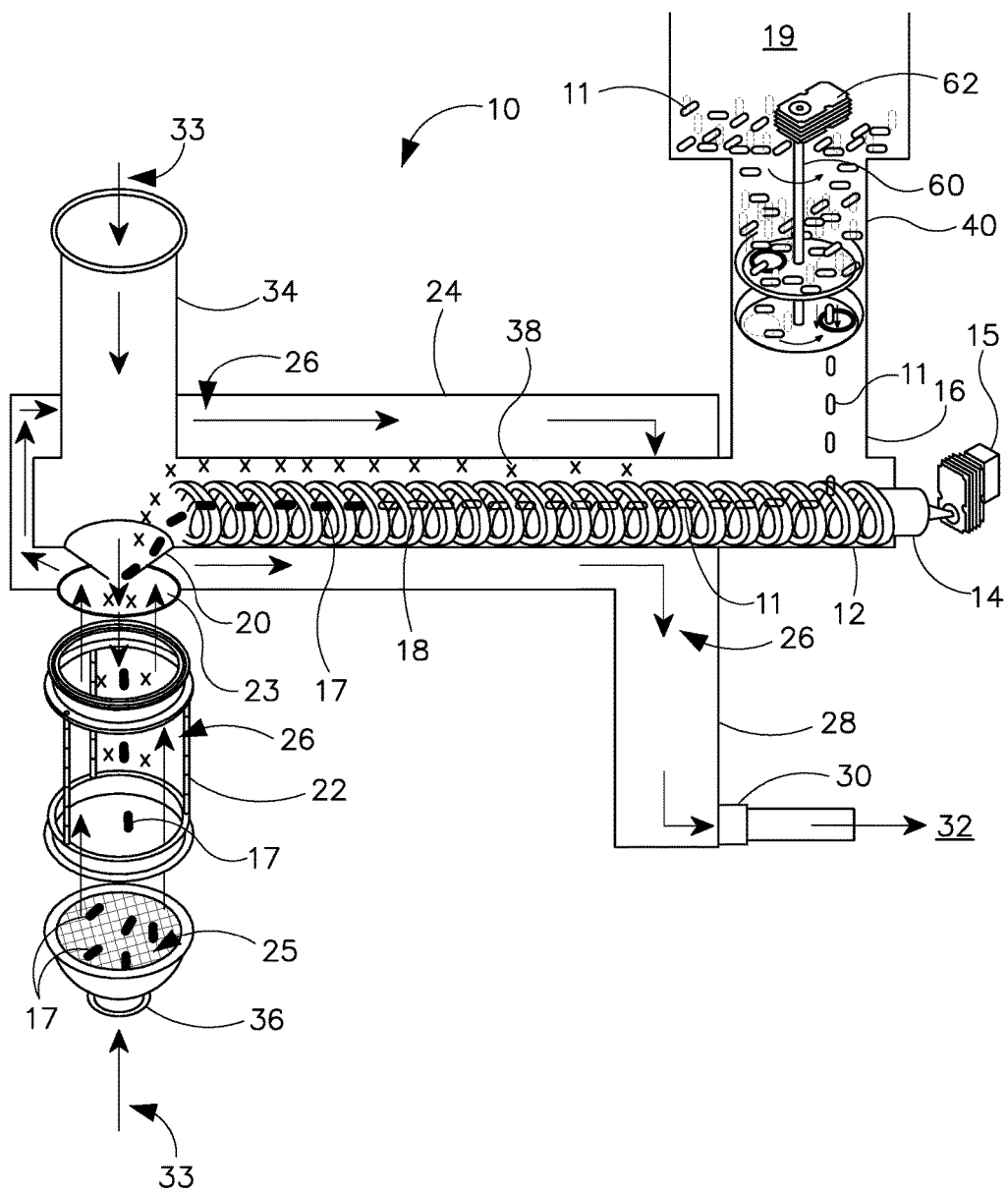
FIG. 1 is an illustration of fuel and fluid movement in a pellet stove according to the present invention.

Referring to FIG. 1, in a preferred embodiment of a pellet stove 10, untorrefied pellets 11 are driven through a torrefaction tube 12 by an auger 14, driven by an electric gear motor 15. Pellets 11 come into torrefaction tube 12 by way of a first vertical pellet delivery tube 16, which is connected to a hopper 19. Auger 14 moves pellets 11 to a funnel 20, located directly over combustion chamber 22, into which pellets 11 drop. The funnel 20 has a three inch outer diameter at its widest point and is held in place by its attachment to torrefaction tube 12, and combustion chamber 22 has a four inch inner diameter so that an open margin 23 exists about the funnel.

Figure 2:
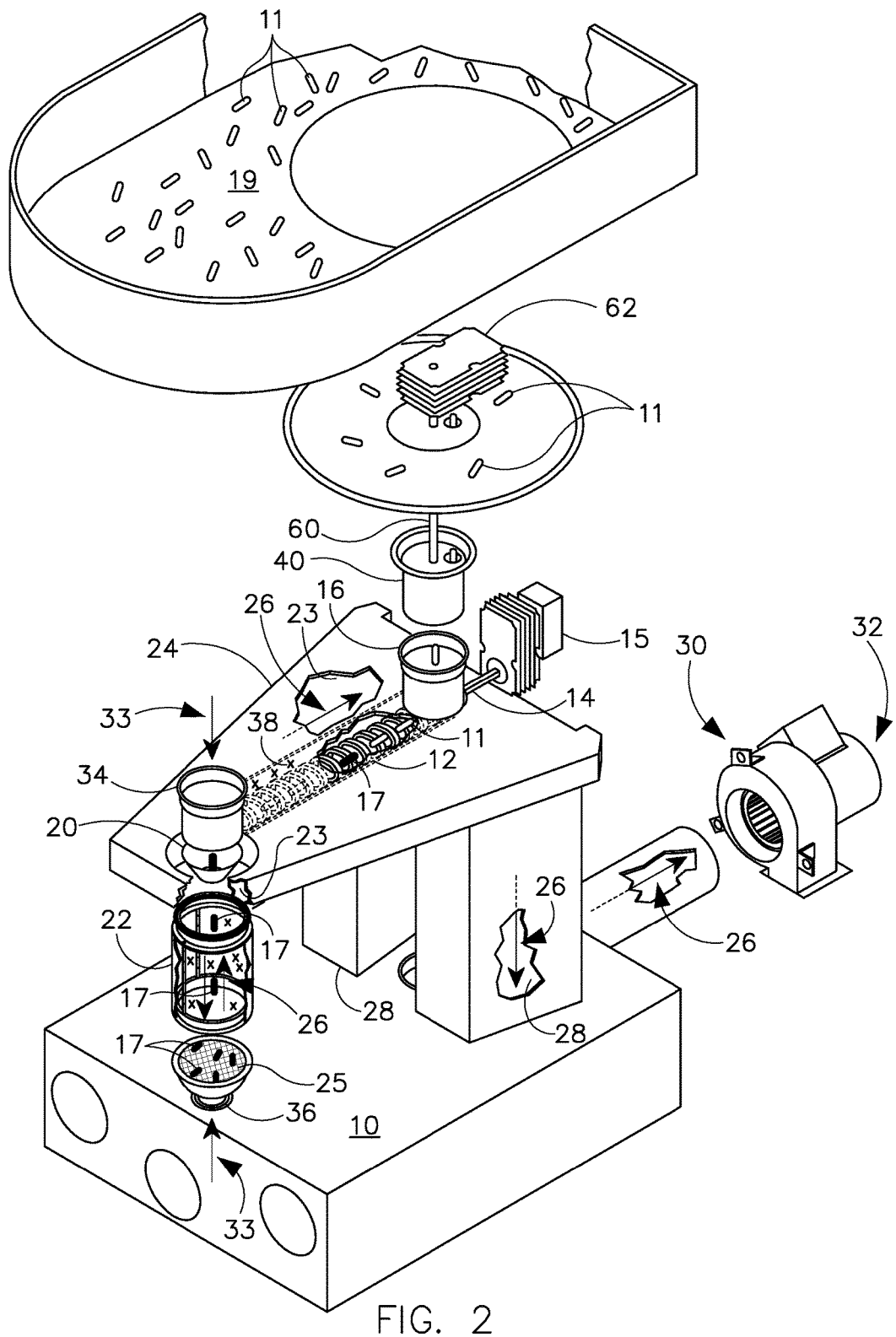
FIG. 2 is a top-side isometric view of the pellet stove of FIG. 1, having various elements removed so that the remaining elements can be shown in unobstructed view.

Exhaust 26 from combustion chamber 22 passes upward through open margin 23 and into a primary heat exchanger 24, which is sealed on the top, bottom and sides, so that exhaust gases move horizontally and rearward, within the confines of heat exchanger 24, until reaching the secondary heat exchanger 28 and then exiting through exhaust fan 30, and finally exiting to an outside area 32, as shown in FIG. 2. Fan 30, by drawing exhaust out of combustion chamber 22, creates negative pressure that is filled by air 33 entering through top air inlet 34 and bottom air inlet 36. In addition negative pressure in combustion chamber 22 draws in volatile organic compounds (VOCs) 38 that are emitted from pellets 11, as they are heated. Burning of the VOCs 38 increases the efficiency of stove 10, and also reduces the emissions of volatile organic compounds 38 from stove 10. In a stove in which pellets 11 are burned without first being torrefied, the pellets are burned on burn grate 25 after entering combustion chamber 22, and during this period of time VOCs 38 are emitted which may not be fully combusted in the process and which may escape. But in stove 10, the entire volume of the combustion chamber 22 is kept at a higher temperature than in a comparable stove burning pellets that have not been torrefied, so that entering VOCs 38 are quickly burned and more completely burned.

Torrefaction tube 12 runs through heat exchanger 24, so that the pellets are heated as they travel through torrefaction tube 12 and converted into torrefied pellets 17 in this hot, 400-570 degree Fahrenheit low-oxygen environment. Because pellets 11 are fairly low in mass, the torrefaction process can take as little as 10 to 20 minutes. In a preferred embodiment, torrefaction tube 12 is length adjustable, by means of telescoping, for example, to accommodate differing rates of pellet feed, with a higher mass (for example greater than 2.5 kilograms) of pellets 11 being fed into the tube 12, requiring a longer tube 12. In one preferred embodiment the tube 12 has a length of 70 cm. In another preferred embodiment the length of tube 12 is adjustable between 50 and 100 cm.

If air were permitted to freely enter torrefaction tube 12, pellets 11 could combust while in torrefaction tube 12, creating a dangerous condition. To prevent this from happening, an air-lock/burn-back valve 40 is located in first vertical pellet delivery tube 16. On the end where torrefaction tube 12 enters funnel 20, the negative pressure created by exhaust fan 30 prevents air from entering torrefaction tube 12 from combustion chamber 22.

Figure 1A:
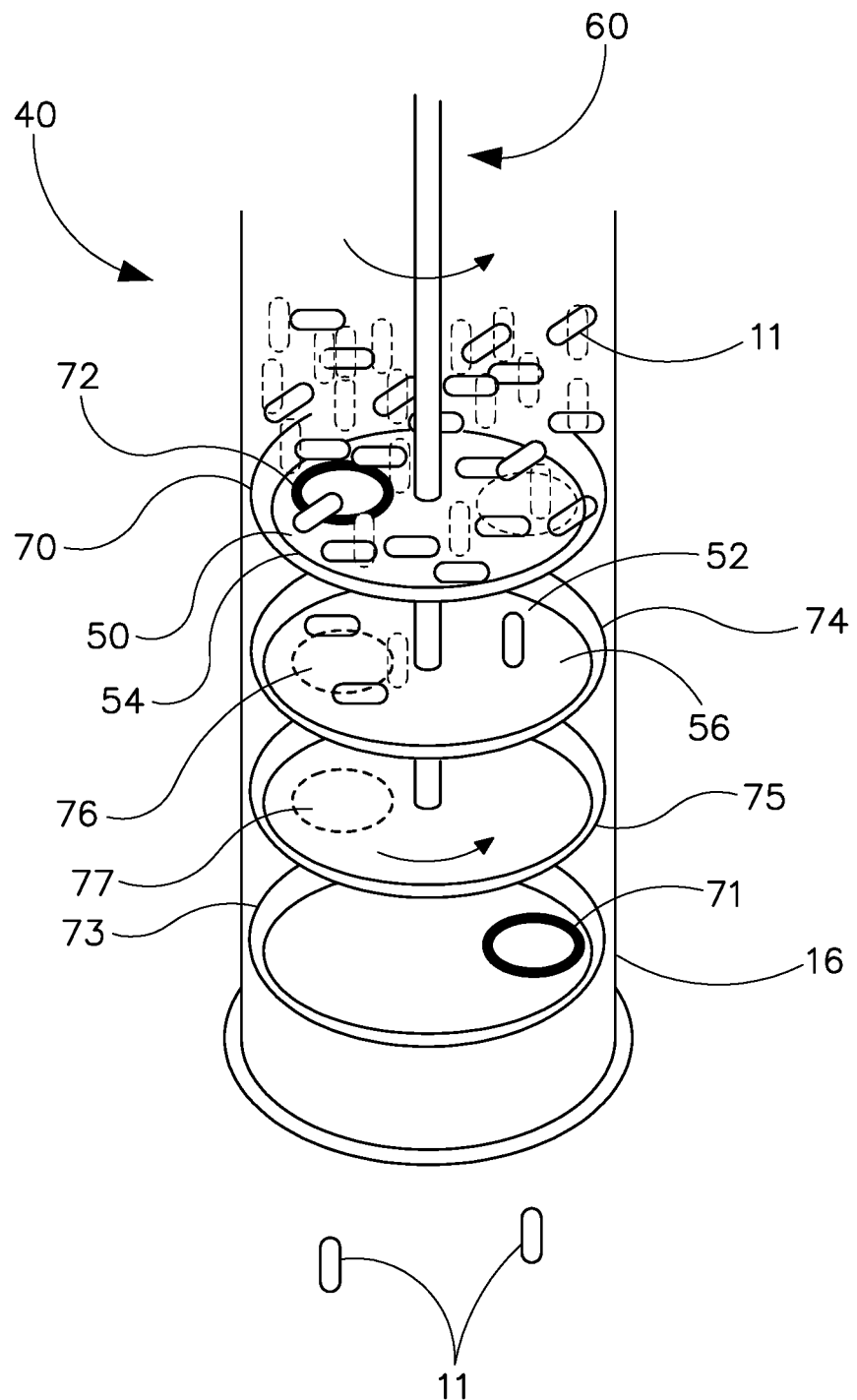
FIG. 1A is an expanded view of a detail of the stove of FIG. 1, showing a pellet air-lock/burn-back valve.

Referring to FIG. 1A, in a preferred embodiment air-lock/burn-back valve 40 within pellet delivery tube 16 includes fixed top and bottom horizontal plates 70 and 71 respectively, and two intermediary rotating plates 74 and 75, spaced 0.004 to 0.010 thousandths of an inch beneath fixed plate 70 and above fixed plate 71, respectively. Rotating plate 74 is spaced 3 to 10 centimeters above rotating plate 75. Fixed plates 70 and 71 have apertures 72 and 73 that are about 180° out of alignment relative to each other. Rotating plates 74 and 75 have two rotating apertures 76 and 77 respectively, in alignment with each other. Referring again to FIG. 1, rotating members 74 and 75 are joined together by a shaft 60, which extends into hopper 19 and is driven by an electric gear motor 62.

Accordingly, when top fixed aperture 72 is aligned to rotating aperture 76, fuel pellets enter the space between rotating members 74 and 75. When rotating apertures 76 and 77 are aligned with fixed aperture 72, rotating apertures 76 and 77 are entirely out of alignment to aperture 73, preventing air and pellets from exiting through air-lock 40. When bottom rotating aperture 77 is in alignment to fixed aperture 73, pellets drop through to rotating auger 12. Further, apertures 72, 76, 77 and 73 are positioned, sized and shaped to permit pellet movement, and so that if any opening is created between the apertures of a rotating member and its abutting plate, the apertures of the other rotating member and abutting horizontal plate have no overlap at all, thereby entirely blocking air and pellet flow.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A pellet stove, comprising:
   a. a pellet hopper;
   b. a combustion chamber;
   c. a pellet movement assembly, adapted to move said pellets from said hopper into said combustion chamber;
   d. wherein said pellet movement assembly is located and configured so as to be heated by exhaust gasses from said combustion chamber and wherein said pellets spend a sufficient amount of time in said pellet movement assembly, and wherein oxygen is prevented from freely flowing into said pellet movement assembly, so that said pellets are torrefied during transit to said combustion chamber;
   e. wherein said pellets in said pellet movement assembly generate volatile organic compounds; and
   f. wherein said volatile organic compounds are captured and delivered to, and burned in, said combustion chamber.

2. The pellet stove of claim 1, wherein said pellet movement assembly is a screw auger in a tube.

3. The pellet stove of claim 2, wherein said tube terminates in a funnel that permits pellets to drop into said combustion chamber.

4. The pellet stove of claim 3, wherein air is permitted to enter said funnel from outside of said stove, and said entering air helps to sweep pellets and volatile organic compounds into said combustion chamber.

5. The pellet stove of claim 3, further including a primary heat exchanger, through which exhaust gasses flow, and wherein said funnel is not joined to the top of the combustion chamber, but wherein a space exists between said funnel and said combustion chamber, through which exhaust gases escape to said primary heat exchanger.

6. The pellet stove of claim 5, wherein said tube extends through said primary heat exchanger.

7. The pellet stove of claim 1, wherein an air-lock/burn-back valve joins said pellet hopper to said pellet movement assembly, said air-lock/burn-back valve having a hopper open state and a hopper closed state and a movement assembly open state and a movement assembly closed state wherein said hopper open state said air-lock/burn-back valve accepts pellets and air from said hopper and in said movement assembly open state said airlock delivers pellets and air into said movement assembly, wherein when said air-lock/burn-back is in its hopper open state it is in said movement assembly closed state, and when said air-lock/burn-back valve is in its movement assembly open state it is in said hopper closed state.

8. The pellet stove of claim 7, wherein said airlock includes two rotating plates, each of which abuts a stationary plate having an aperture, said rotating plates defining a space in between, each rotating plate having a hole and configured relative to said apertures of said abutting stationary plates so that said holes align to said apertures and therefore open to said hopper and said movement assembly at mutually exclusive times.

9. A method of burning pellets in a pellet stove, comprising:
   a. providing a pellet stove, having:
      i. a pellet hopper;
      ii. a combustion chamber, in which pellets are being burned;
      iii. a pellet movement assembly, adapted to move said pellets from said hopper into said combustion chamber; and
      iv. wherein said pellet movement assembly is located and configured so as to be heated by exhaust gases from said combustion chamber;
   b. moving said pellets to said combustion chamber while maintaining a low oxygen environment in said movement assembly, so that said pellets are torrefied as they move to said combustion chamber, wherein said pellets in said pellet movement assembly generate volatile organic compounds and wherein said volatile organic compounds are captured and delivered to, and burned in, said combustion chamber; and
   c. delivering said torrefied pellets to said combustion chamber, where combustion chamber heat and oxygen ignites them.

10. The method of claim 9, wherein said pellet movement assembly is a screw auger in a tube.

11. The method of claim 10, wherein said tube terminates in a funnel that permits pellets to drop into said combustion chamber.

12. The method of claim 11, wherein air is permitted to enter said funnel from outside of said stove, and said entering air helps to sweep pellets and volatile organic compounds into said combustion chamber.

13. The method of claim 12, wherein said pellet stove further includes a primary heat exchanger, through which exhaust gases flow, and wherein said funnel is not joined to the top of the combustion chamber, but wherein a space exists between said funnel and said combustion chamber, through which exhaust gases escape to said primary heat exchanger.

14. The method of claim 13, wherein said tube extends through said primary heat exchanger.

15. The method of claim 9, wherein an air-lock/burn-back valve joins said pellet hopper to said pellet movement assembly, said air-lock/burn-back valve having a hopper open state and a hopper closed state and a movement assembly open state and a movement assembly closed state wherein in said hopper open state said air-lock/burn-back valve accepts pellets and air from said hopper and in said movement assembly open state said airlock delivers pellets and air into said movement assembly, wherein when said air-lock/burn-back is in its hopper open state it is in said movement assembly closed state, and when said air-lock/burn-back valve is in its movement assembly open state it is in said hopper closed state.

16. The method of claim 15, wherein said airlock includes two rotating plates, each of which abuts a stationary plate having an aperture, said rotating plates defining a space in between, each rotating plate having a hole and configured relative to said apertures of said abutting stationary plates so that said holes align to said apertures and therefore open to said hopper and said movement assembly at mutually exclusive times.

* * * * *